(12) United States Patent
Lim et al.

(10) Patent No.: US 7,236,485 B2
(45) Date of Patent: Jun. 26, 2007

(54) CALL FORWARDING METHOD

(75) Inventors: Jung-Ouk Lim, Suwon-shi (KR);
Young-Sang Lee, Seoul (KR)

(73) Assignee: Samsung Electronics Co., Ltd.,
Suwon-si, Gyeonggi-do (KR)

( * ) Notice: Subject to any disclaimer, the term of this patent is extended or adjusted under 35 U.S.C. 154(b) by 1051 days.

(21) Appl. No.: 10/202,890

(22) Filed: Jul. 26, 2002

(65) Prior Publication Data

US 2004/0017803 A1    Jan. 29, 2004

(51) Int. Cl.
*H04L 12/28* (2006.01)
(52) U.S. Cl. ........................ 370/352; 370/356
(58) Field of Classification Search ............... None
See application file for complete search history.

(56) References Cited

U.S. PATENT DOCUMENTS

| 5,805,587 | A |   | 9/1998  | Norris et al. |         |
|-----------|---|---|---------|---------------|---------|
| 5,917,817 | A |   | 6/1999  | Dunn et al.   |         |
| 5,982,774 | A |   | 11/1999 | Foladare et al. |       |
| 6,091,808 | A |   | 7/2000  | Wood et al.   |         |
| 6,125,126 | A | * | 9/2000  | Hallenst.ang.1 | 370/522 |
| 6,381,320 | B1 |  | 4/2002  | Creamer et al. |        |
| 6,411,704 | B1 |  | 6/2002  | Pelletier et al. |      |
| 6,697,357 | B2 | * | 2/2004 | Emerson, III  | 370/352 |
| 6,785,266 | B2 | * | 8/2004 | Swartz        | 370/352 |
| 6,816,469 | B1 | * | 11/2004 | Kung et al.  | 370/260 |
| 6,829,243 | B1 | * | 12/2004 | Sundhar      | 370/401 |
| 7,006,455 | B1 | * | 2/2006  | Fandrianto et al. | 370/260 |
| 2001/0040886 | A1 |  | 11/2001 | Jimenez et al. | |
| 2001/0043588 | A1 |  | 11/2001 | Sallberg     | |
| 2002/0037076 | A1 |  | 3/2002  | Perlmutter   | |
| 2003/0095542 | A1 | * | 5/2003 | Chang et al. | 370/352 |
| 2005/0074104 | A1 | * | 4/2005 | Swartz       | 379/142.08 |

FOREIGN PATENT DOCUMENTS

| WO | WO 97/26749 |    | 7/1997 |
| WO | WO 98/07266 |    | 2/1998 |
| WO | WO 01/39478 | A1 | 5/2001 |
| WO | WO 02/43338 | A1 | 5/2002 |

* cited by examiner

*Primary Examiner*—Phirin Sam
(74) *Attorney, Agent, or Firm*—Robert E. Bushnell, Esq.

(57) ABSTRACT

The present invention relates to a call forwarding method for a web phone which connects to at least two networks and is mounted with at least two communication ports. According to the call forwarding method, if a call is received at the selective call forwarding mode, the call forwarding mode is checked. If the call forwarding mode is set, the web phone announces such to a calling party, receives a port for call forwarding from the calling party, and conducts the calling forwarding unless the port received from the calling party is not of a busy route. If the web phone is on the automatic call forwarding mode and receives a call, the phone forwards the call to a predetermined number after confirming that the predetermined port for call forwarding is not of a busy route.

10 Claims, 4 Drawing Sheets

CALL FORWARDING METHOD

BACKGROUND OF THE INVENTION

1. Field of the Invention

The present invention relates generally to services provided by web phone system, and in particular, to a call forwarding method.

2. Description of the Related Art

In general, the World Wide Web is used for information exchange using e-mails or relatively simple chatting programs, and recently, more people have been using a web phone for voice communication with another party over the Internet. The web phone is a terminal through which a person, besides making phone calls, can connect to the Internet through a phone interface like phone line, ISDN (Integrated Services Digital Network), and ADSL (Asymmetric Digital Subscriber Line) or packet network like LAN (Local Area Network) and get services including information search, e-mail and so forth. These Internet phones and web phones work on the basis of VoIP (Voice over Internet Protocol) that is a support system capable of loading not only data but also voice by using IP (Internet Protocol), the level protocol of Internet network.

Phone communication through the Internet network allows people to make long distance calls like international calls only at the charge of local phone calls. This economic advantage accelerates the commercial use of the web phone. U.S. Pat. No. 6,125,126 to Hallenstål, entitled METHOD AND APPARATUS FOR SELECTIVE CALL FORWARDING, issued on Sep. 26, 2000, U.S. Pat. No. 6,381,320 to Creamer et al., entitled ACCESS TO EXTENDED TELEPHONE SERVICES VIA THE INTERNET, issued on Apr. 30, 2002 and PCT publication No. WO 01/39478 A1 to Joung, entitled METHOD AND SYSTEM FOR TRANSMITTING COMMUNICATION SIGNALS THROUGH INTERNET AND A PUBLIC SWITCHED TELEPHONE NETWORK, published on May 31, 2001 contemplate call forwarding using internet phones or web phones. However, what is needed is a user friendly call forwarding method for calls placed to web and internet phones that 1) check to see if the internet phone has the call forwarding feature activated, 2) check whether it is at a time of day and on a day where call forwarding is activated, 3) check whether automatic or selective call forwarding mode is set, 4) enables the calling party to specify the route and the destination where the call is to be forwarded when in selective call forwarding mode, 5) provides visual displays and audio announcements to the calling party to guide the calling party through the call forwarding process and 6) determines if ring signals generated are greater than a predetermined frequency.

SUMMARY OF THE INVENTION

It is therefore an object of the present invention to provide an improved call forwarding method for forwarding an incoming call to another number in a web phone system.

It is also an object of the present invention is to provide a more convenient call forwarding method for users using a web phone system.

It is yet another object of the present invention to enable both automatic call forwarding and selective call forwarding to web phone or to a PSTN phone.

It is still also an object of the present invention to enable call forwarding where the caller can select the route of a call (e.g., PSTN port, ISDN port, LAN port, WAN port etc.).

It is still also an object of the present invention to enable selective call forwarding where the caller can select whether his call is to be forwarded to an IP address or to a PSTN telephone number.

It is still also an object of the present invention to enable selective call forwarding where the caller can select the IP address where his call is to be forwarded to.

It is yet further an object of the present invention to enable selective call forwarding where the caller can select which telephone number his call is to be forwarded to.

To achieve these and other objects, there is provided a call forwarding method for both selective and automatic call forwarding, the method including the steps of checking whether a call forwarding mode is set when an incoming call is received to a web phone having at least two communication ports that are connectable to communicationable networks, forwarding the call to a destination (i.e., an IP address or a telephone number) of the calling party's choice in the case of selective call forwarding and via route of the calling party's choice in the case of selective call forwarding, checking whether the forwarding route is busy, performing call forwarding when the route is not busy and displaying an error message when either the forwarding number is busy, the route is busy or the connection to the destination fails.

The present invention contemplates a calling party's phone as having an LCD display to display various messages throughout the call forwarding process. The present invention further contemplates that the called web phone have a call process controller to control the overall process of the call forwarding, including displaying the appropriate message on the calling party's LCD, generating voice announcements to be heard by the calling party instructing the calling party through the call forwarding process, means for calling party's input including a microphone and key input enabling the calling party to specify the route (PSTN, ISDN, LAN, WAN, etc.) in addition to a destination IP address or a PSTN telephone number in the case of selective call forwarding.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
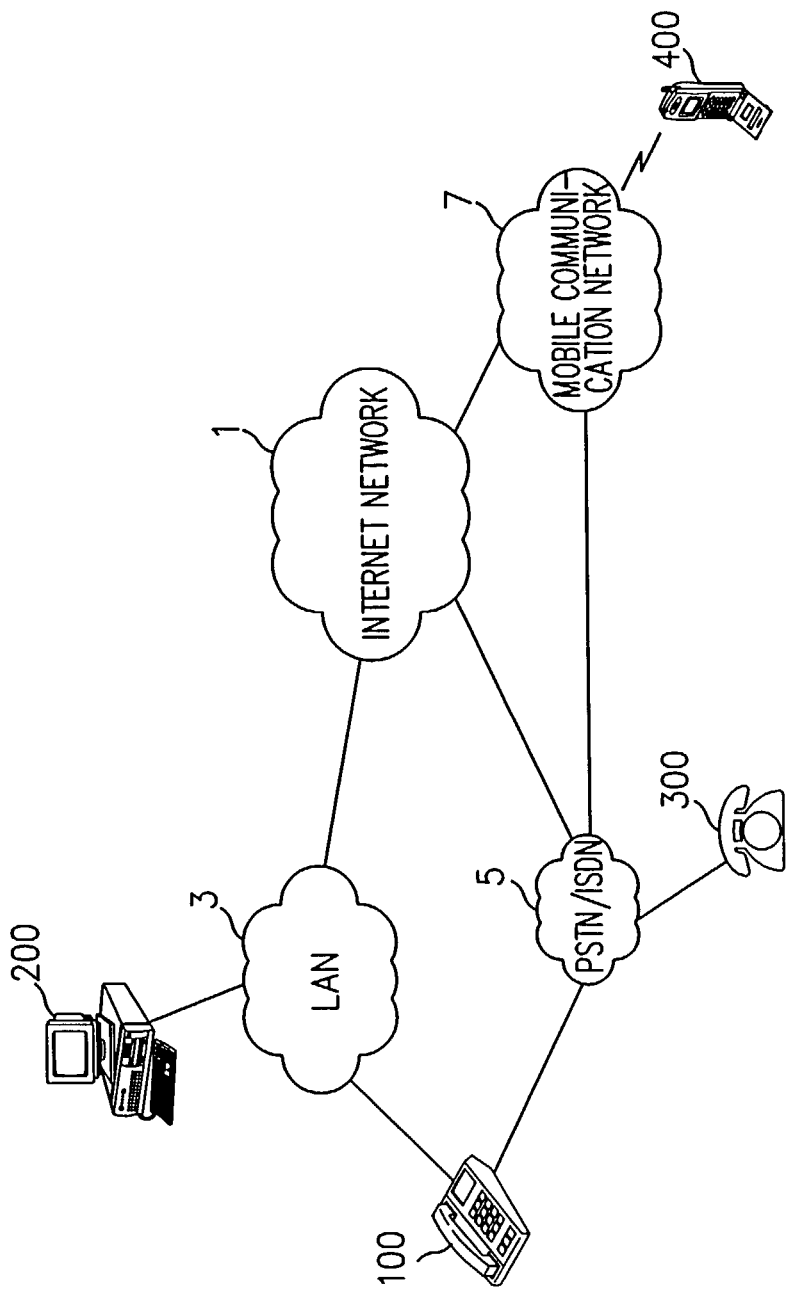
FIG. 1 is a schematic diagram of a web phone system in accordance with a preferred embodiment of the present invention.

The structure of a web phone is explained with reference to FIG. 1. FIG. 1 is a schematic diagram of a web phone system according to a preferred embodiment of the present invention. As shown in FIG. 1, the web phone system includes a web phone 100 that is connected to Internet network 1, LAN 3, PSTN/ISDN 5, mobile communication network 7 and every network, a computer 200 mounted with Internet phone or web phone function, a telephone 300, and a mobile communication terminal 400. Internet network 1 is an aggregate network of many networks that provides e-mail, telnet, FTP (File Transfer Protocol), Internet information search (Gopher), IRC (Internet Relay Chatting), BBS (Bulletin Board System), WWW (World Wide Web), real time broadcast service including time-varying image or voice data and so forth. LAN 3 is a small unit information network that enables exchange general information like voice, data and image by connecting small-sized buildings clustered close together within in a limited area. PSTN/ISDN 5 includes PSTN, a communication network that provides voice service like a phone by connecting users to an electronic switch, and ISDN is a digital integrated network that integrates telephone network, telegraph network, data communication network, mobile communication network etc. in one. Mobile communication network 7 provides communication between a cellular phone to other telephones. Web phone 100 is easily connected to the Internet where it conducts information search and gets service like e-mail, and can also make phone calls in general. Particularly, the web phone 100 in the present invention includes a connection port for connecting to LAN 3 and PSTN/ISDN 5. In fact, the web phone 100 connects to the Internet network 1 through LAN 3 and PSTN/ISDN 5, and has phone communication with the computer 200 mounted with an Internet phone or web phone function, the telephone 300 and the mobile communication terminal 400.

The present invention concerns the call forwarding service provided to the web phone 100 in the web phone system. The present invention discusses a series of steps taken by a user of computer 200, in which the computer is mounted with an Internet phone or web phone, as he or she makes a call, using the web phone 100, to the telephone 300 or the mobile communication terminal 400. The structure of the web phone 100 for implementing the call forwarding service is illustrated in FIG. 2.

Figure 2:
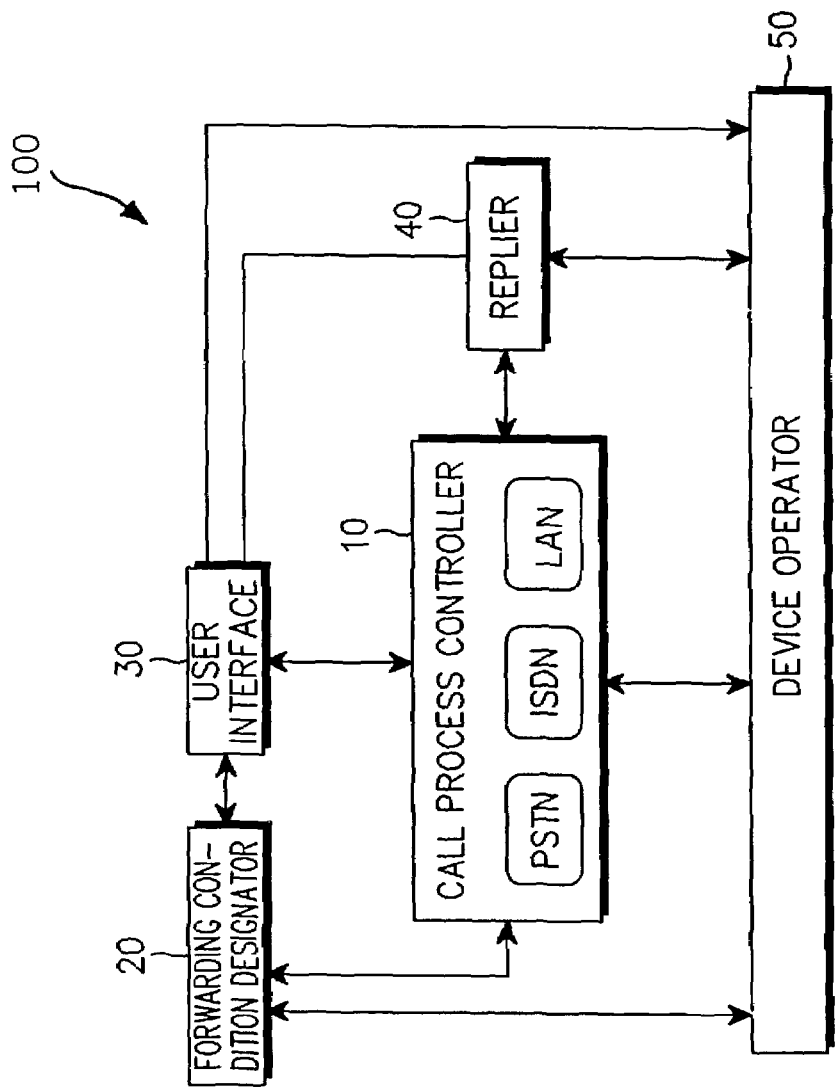
FIG. 2 is a block diagram of a web phone in accordance with the preferred embodiment of the present invention.

FIG. 2 is a block diagram of the web phone according to the present invention. As illustrated in FIG. 2, the web phone 100 used for call forwarding includes call process controller 10, forwarding condition designator 20, user interface 30, replier 40, and device operator 50. Call process controller 10 controls the general operation procedure associated with call forwarding, and according to the call forwarding procedure, controls the forwarding condition designator 20, the user interface 30, the replier 40 and the device operator 50. User interface 30 includes a microphone, a speaker, a key input, and a display. Any input from a user is done through the key input and the microphone, and under the call process controller 10's control. The user interface 30 provides any output through the speaker and the display. Information about the call forwarding is displayed on the display. Forwarding condition designator 20 designates, under the call process controller 10's control, conditions for forwarding calls according to input from the user. In the present invention, the call forwarding settings that users can edit and change include the start/end point of the call forwarding service, different call forwarding modes, routes and so forth. The user can limit call forwarding service to occur only on particular days or at particular times. Moreover, the call forwarding service could be set in such way that when a call is received, the frequency of ring signals is counted, so if the ring signal is generated over a certain frequency, the call forwarding service is put into work. Call forwarding service could also be set to start at the time a call is received.

Call forwarding modes are divided into an automatic call forwarding mode and a selective call forwarding mode. The automatic call forwarding service forwards every call received to the web phone 100 to a predetermined terminal by presetting the call route and the terminal number the incoming call is supposed to be forwarded to. The selective call forwarding service allows an outside caller to the web phone 100 to be able to input the call route and terminal number the caller's call is to be forwarded to. In the present invention, call forwarding can be accomplished according to a user selected call route and destination. The call route described above is a communication port mounted on the web phone 100. In the present invention, PSTN port, ISDN port, and LAN port the call routes from which a user can choose to route the forwarded call. Replier 40 generates an announcement message according to the call forwarding procedure under the control of the call process controller 10. Device operator 50 operates every kind of device included in the web phone 100 under the call process controller 10's control.

When the web phone 100 receives a call, the call process controller 10 first checks whether the call forwarding mode is properly set for the web phone 100, and finds out which mode (i.e., the automatic call forwarding mode or the selective call forwarding mode) has been set. In the case automatic call forwarding mode has been set, the call process controller 10 tries to connect every incoming call to a predetermined terminal through a predetermined call route. In the case selective call forwarding mode has been set, the call process controller 10 receives a call route and a terminal number from the calling party, and dials the terminal's number given by the user based on the call route selected.

Figure 3A:
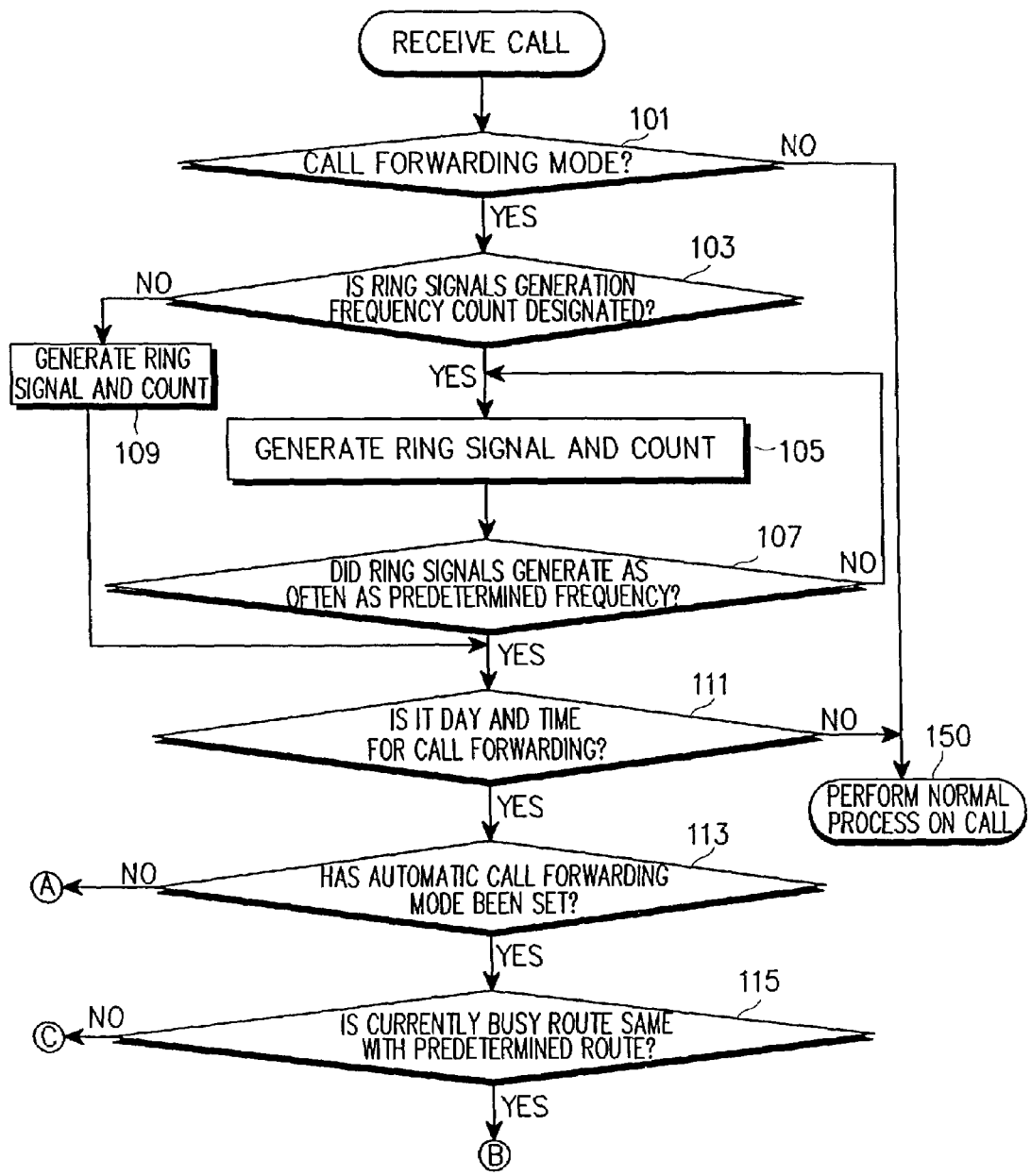
FIG. 3A is an operation flow chart of a call process controller, particularly during the procedure of checking call forwarding execution condition in accordance with the preferred embodiment of the present invention.
Figure 3B:
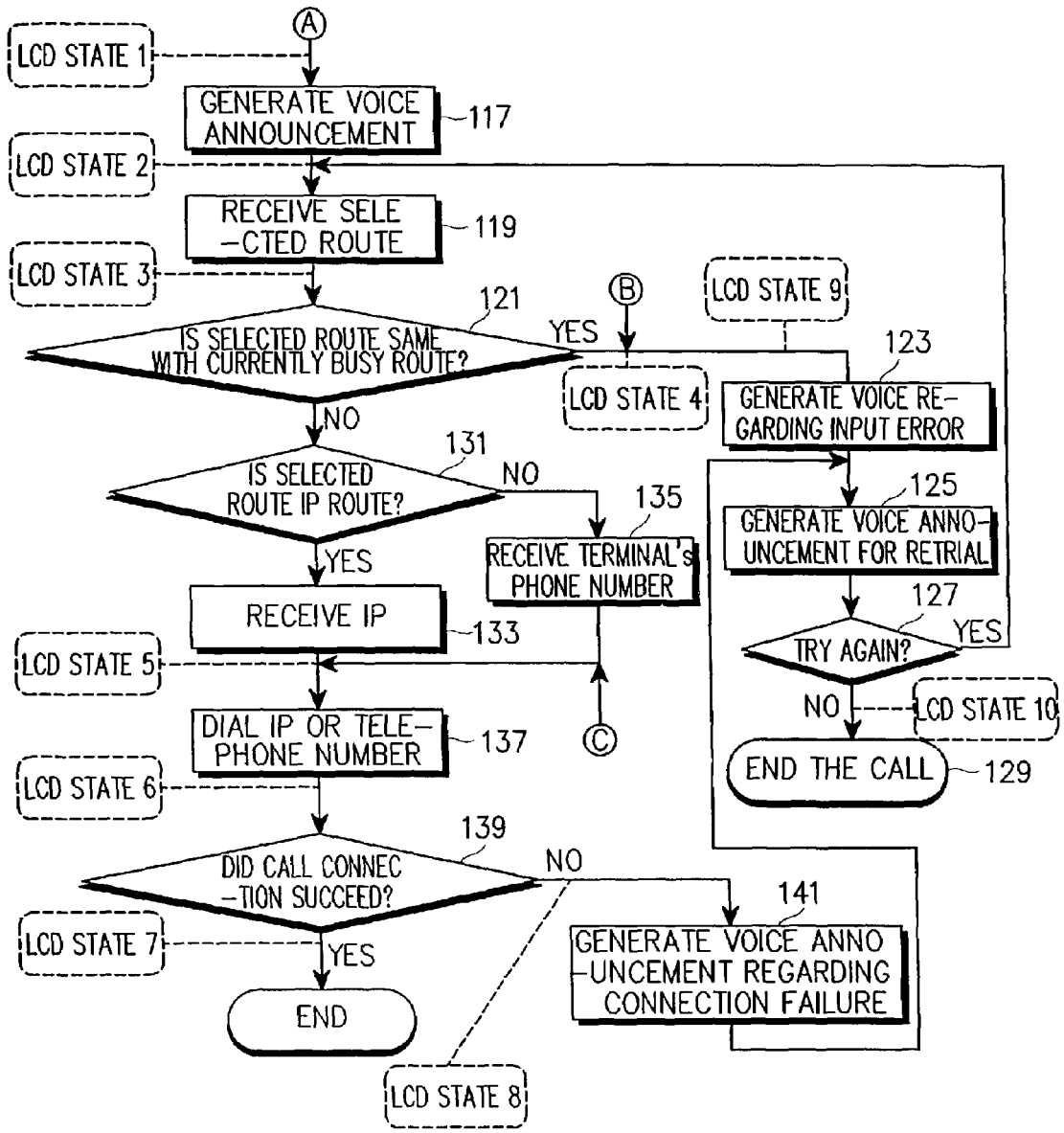
FIG. 3B is an operation flow chart of a call process controller complying with the call forwarding procedure in accordance with the preferred embodiment of the present invention.

A more detailed illustration of the inventive call forwarding procedure is illustrated in FIGS. 3A & 3B. FIGS. 3A & 3B illustrates a flow chart of the call forwarding process in accordance with the preferred embodiment of the present invention. FIG. 3A illustrates that the call forwarding settings set for the web phone 100 are checked, and then following the procedure shown in FIG. 3B, the call is forwarded.

Referring to FIGS. 3A & 3B, upon receiving a call, the call process controller 10 of the web phone 100 confirms whether the web phone is set in call forwarding mode at step 101. If web phone 100 is set in call forwarding mode, step 103 is executed next. If web phone 100 is not set in call forwarding mode, step 150 is executed immediately after step 101. In the step 150, the call process controller 10 processes the incoming call without forwarding. In the step 103, the call process controller 10 confirms whether a predetermined frequency for ring signal generation frequency count has been set, and if the predetermined frequency count has been set, step 105 is then executed. If the predetermined frequency count has not been set, the control proceeds to step 109. In step 105, the call process controller 10 generates a ring signal, counts the generation frequency, and proceeds to step 107. In the step 107, the call process controller 10 decides whether the ring signals are generated as often as the predetermined frequency. If the ring signals are generated as often as the predetermined frequency, step 111 is then executed. If the ring signals are not generated as often as the predetermined frequency, the control returns to step 105 proceeds where the call process controller 10 generates the ring signals and keeps counting the ring signals until it reaches the predetermined frequency.

In step 109, when the predetermined ring signal generation frequency count has not been set when it is checked in step 103, the ring signals are generated and the control passes to step 111. In step 111, the call process controller 10 decides whether the incoming call falls within the time and date constraints for call forwarding. If the call is received within the permitted time and on a day in which call forwarding is permitted, step 113 is then executed. If the call is received on a day or at a time when calls are not to be forwarded, the control then goes to step 150. In step 113, the call process controller 10 decides whether the automatic call forwarding mode or selective call forwarding mode has been set. If selective call forwarding mode is set, the process proceeds immediately to step 117. In the step 117, the call process controller 10 sends a voice announcement prompting the caller to select a route (PSTN, ISDN or LAN) and the caller chooses a route in step 119 and the control advances to step 121. In step 121, a check is made to determine if the route selected is busy. If the chosen route is busy, the control proceeds to step 123 where a voice announcement informs the caller that the selected route is busy. If the chosen caller route is not busy, the control proceeds to step 131.

Web phone 100 according to the present invention has one of each PSTN port, ISDN port, and LAN port, meaning that it is impossible to connect a terminal to another through the port that is already designated for a call. Therefore, when the caller chosen route is busy, step 123 is executed where controller 10 sends an input error voice to the outside caller's terminal and then the control proceeds to step 125. In step 125, the call process controller 10 sends a voice announcement asking if the caller would like to attempt again to place the call. In the step 127, the call process controller 10 finds out whether the outside caller wishes to attempt the call again. If the caller wishes to proceed with another attempt, the process loops back to step 119 where the caller selects a route. If the caller chooses not to attempt the call again, the process concludes at step 129 where the call is ended.

If, in step 121, the controller determines that the route selected by the caller is not busy, the control proceeds to step 131 where controller 10 determines whether the route selected by the caller is an Internet Protocol (IP) route or a telephone route. If the route selected by the caller is an IP route, step 133 is executed where the caller selects the IP address to where the caller would like the call to be forwarded to. If, in step 131, the controller 10 determines that the route selected by the caller is not an IP route, step 135 is executed where the caller enters a telephone number where the caller would like the call to be forwarded to. After controller receives the IP address from the caller (in the case step 133 is executed) or receives the telephone number (in the case step 135 is executed), the control passes to step 137 where the process controller dials up the IP address or the telephone number that the caller would like the call to be forwarded to. Step 137 is automatically followed by step 139 where it is determined whether the connection to the IP address or the telephone number succeeded. If the connection in step 139 is a success, the process ends. If the connection fails in step 139, the control proceeds to step 141 where the caller is notified by a voice announcement that the connection failed. Step 141 is followed by step 125 where another voice announcement asks the user whether the user would like to attempt to place the call again.

In the scenario where step 113 is executed with automatic call forwarding mode set, the process proceeds to step 115 where the processor 10 determines whether the route for the call forwarding is busy. If the route is busy, steps 123 and 125 are executed where a voice informs the caller that the route is busy and asks the caller if the caller would like to try again. In the case that the route is not busy during automatic call forwarding, the control proceeds to step 137 where the controller tries to connect with the IP address or the telephone number the caller's call is to be forwarded to.

The following table shows the contents that are displayed to the caller on the LCD display (Liquid Crystal Display) throughout the call forwarding process. FIG. 3B illustrate 10 possible displays that are displayed to the caller at various points in the call forwarding process. As manifested in the table, the user is provided with status information on user interface 30 of web phone 100's display at various steps in the call forwarding process.

TABLE

| LCD State number | Web Phone 100's State | Content to be displayed |
|---|---|---|
| 1 | Received a call requesting call forwarding. | Display that the call requesting call forwarding is received. |
| 2 | Destination queue of the selected route for call forwarding. | Display that the selected route for call forwarding is being queued. |
| 3 | Received the selected route for call forwarding. | Display the kind of the route for call forwarding received. |
| 4 | The selected route for call forwarding is the same with the currently busy route. | Display that the selected route value is incorrect. |
| 5 | Be in process of receiving IP or telephone number for call forwarding. | Display the IP or telephone number received |
| 6 | Dial IP or telephone number. | Display that the IP or telephone number is being dialed. |
| 7 | Call is forwarded. | Display that the IP or telephone number received, the IP or telephone number dialed, and the call are forwarded. |
| 8 | Dialing is failed. | Display that the dialing is failed. |
| 9 | Queueing for retrial | Display that it is queueing for retrial. |
| 10 | End of call | Display that the call is ended. |

In conclusion, the present invention provides high quality and more convenient communication service to the users by forwarding incoming calls to the web phone.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A call forwarding method for a web phone mounted with at least two communication ports that are connectable to communicationable networks, the method comprising the steps of:

checking whether a call forwarding mode is set when an incoming call is received by a web phone;

checking whether said web phone is set to selective call forwarding mode or to automatic call forwarding mode;

prompting a caller for a call route and a destination to forward said call when said web phone is set to selective call forwarding mode;

determining whether said call route is busy;

performing call forwarding when said call route is not busy;

checking whether the forwarded call is connected after the performing step; and generating an announcement regarding connection failure to the caller when the call fails to connect during the performing step.

2. The method of claim 1, further comprising the step of conducting the performing step again after sending an announcement to said caller regarding connection failure.

3. The method of claim 2, further comprising steps of:

generating an announcement to said caller asking said caller whether said caller would like another attempt to forward said call again; and attempting to forward said call again when said caller supplies a signal indicating that the caller wishes another attempt at forwarding said call.

4. The method of claim 1, further comprising the steps of:

generating an error message to the caller when the call route is busy; and attempting call forwarding again upon receipt from said caller a reply indicating that the caller wishes another attempt at forwarding said call.

5. The method of claim 1, further comprising the steps of:

determining whether said route for forwarding said call is currently busy;

forwarding said call to said destination when said route is not busy;

notifying said caller when said route for forwarding said call is busy; and asking caller whether said caller would like to again attempt to forward said call when said route is busy.

6. A method for forwarding a call placed to a web phone, said method comprising the steps of:

determining whether said web phone is set for selective call forwarding mode or automatic call forwarding mode;

attempting to forward said call from a caller to a preset forwarding destination when said web phone is set to automatic call forwarding mode;

automatically informing said caller when a route for forwarding said call is busy;

automatically informing said caller when a connection failure occurs during said call forwarding; and receiving a response from said caller to said web phone whether said caller wishes to attempt to forward said call again after said caller is informed that said call forwarding failed.

7. The method of claim 6, said method being preceded by the steps of:

determining whether said web phone has call forwarding mode activated;

determining whether said caller's call is placed at a time of day and on a day when said web phone forwards calls; and forwarding said caller's call only when said web phone has call forwarding activated, said caller's call is placed at a time and on a day that said web phone forwards calls and when said route for forwarding said caller's call is not presently busy.

8. The method of claim 6, said method further comprising the steps of:

determining whether a predetermined ring signal generation frequency count has been set up;

generating ring signals and count;

determining whether said generated ring signals occur as often as said predetermined ring signal frequency count; and forwarding said call only when said generated ring signals occur as often as said predetermined ring signal frequency count.

9. A method for forwarding a call placed to a web phone, said method comprising the steps of:

determining whether said web based phone is set for selective call forwarding or automatic call forwarding;

asking a caller for a call forwarding route when said web phone is set to selective call forwarding mode;

asking said caller for a destination to where said call is to be forwarded when said web phone is set to selective call forwarding mode;

having said caller communicate to said web phone said forwarding route and a destination when said web phone is in selective call forwarding mode; and attempting to forward said caller's call to said destination via said route, said attempting step being executed only when said web phone is set to a call forwarding mode, a time of day of said caller's call is a time said web phone forwards calls and a day of said caller's call is a day said web phone forwards calls.

10. The method of claim 9, said method further comprising the steps of:

determining whether a predetermined ring signal generation frequency count has been set up;

generating ring signals and count;

determining whether said generated ring signals occur as often as said predetermined ring signal frequency count; and attempting to forward said call only when said generated ring signals occur as often as said predetermined ring signal frequency count.

\* \* \* \* \*